United States Patent [19]
Pecoraro

[11] 4,065,285
[45] Dec. 27, 1977

[54] SEAL FOR THRESHOLD COOLER OR HOLDDOWN MEMBER OF A FLOAT GLASS TANK

[75] Inventor: George A. Pecoraro, Lower Burrell, Pa.

[73] Assignee: PPG Industries, Inc., Pittsburgh, Pa.

[21] Appl. No.: 670,609

[22] Filed: Mar. 26, 1976

[51] Int. Cl.² .......................................... C03B 18/02
[52] U.S. Cl. ................................ 65/182 R; 65/356; 65/374 RM
[58] Field of Search .............. 65/32, 182 R, 374 M, 65/374 RM, 374 R, 356

[56] References Cited
U.S. PATENT DOCUMENTS

| | | | |
|---|---|---|---|
| 710,357 | 9/1902 | Heal | 65/182 R |
| 789,911 | 5/1905 | Hitchcock | 65/182 R |
| 1,564,240 | 12/1925 | Hitchcock | 65/182 R |
| 3,083,551 | 4/1963 | Pilkington | 65/182 R |
| 3,220,816 | 11/1965 | Pilkington | 65/99 A |
| 3,584,475 | 6/1971 | Galey et al. | 65/24 |
| 3,584,477 | 6/1971 | Hainsfurther | 65/182 R |
| 3,594,147 | 7/1971 | Galey et al. | 65/182 R |
| 3,649,237 | 3/1972 | Classen et al. | 65/356 X |
| 3,854,922 | 12/1974 | Sensi et al. | 65/172 |
| 3,884,665 | 5/1975 | Edge et al. | 65/99 A |
| 3,930,826 | 1/1976 | Schornhorst | 65/182 R X |

*Primary Examiner*—Arthur D. Kellogg
*Attorney, Agent, or Firm*—E. Kears Pollock

[57] ABSTRACT

An apparatus for mounting a threshold in communication with a glass forming chamber containing molten metal is provided with end seals about coolers or holddown members extending transversely through holes in the threshold. The end seals are compression fitted to the assembly to prevent the ingress of air into the holes through the threshold.

4 Claims, 3 Drawing Figures

SEAL FOR THRESHOLD COOLER OR HOLDDOWN MEMBER OF A FLOAT GLASS TANK

BACKGROUND OF THE INVENTION

1. Field of the Invention

The present invention relates to an apparatus for manufacture of flat glass wherein the glass is formed while being supported on a surface of a pool of molten metal following delivery thereto as molten glass flowing in a substantially horizontal stream from a glassmaking furnace. More particularly, this invention relates to a combination of elements comprising suitable means for supporting molten glass for delivery onto a pool of molten metal.

2. Brief Description of the Prior Art

It is known that molten glass can be delivered onto molten metal and formed into a continuous ribbon or sheet of glass according to the teachings of Heal, U.S. Pat. No. 710,357; of Hitchcock, U.S. Pat. No. 789,911; of Pilkington, U.S. Pat. No. 3,083,551 and U.S. Pat. No. 3,220,816. In all of the prior art, molten glass is delivered over some rigid element, usualy a refractory member, onto molten metal. In the practice disclosed by Pilkington, the molten glass is delivered through a long, narrow canal and over a lip from which the molten glass falls onto the molten metal and spreads outwardly on the molten metal. The forming chamber containing the molten metal extends upstream toward the source of molten glass in the apparatus disclosed by Pilkington. In the method of Hitchcock, the molten glass is delivered over a refractory wall onto molten metal contained in a forming chamber adjacent to such refractory wall downstream of the furnace in which the molten glass is prepared. In the method of Heal, molten glass is delivered over a refractory bridge.

According to the disclosure of Hitchcock in U.S. Pat. No. 1,564,240, the molten metal on which glass is to be formed into a continuous sheet may be contained within a forming chamber comprising a metal casing. As described in U.S. Pat. Nos. 3,584,475 and 3,594,147 to Galey and Sensi, this metal casing may be provided with a refractory liner. Refractory-lined metal casing structures are shown and described in U.S. Pat. No. 3,584,477 to Hainsfurther.

The bottom portion of a typical forming chamber which contains molten metal on which glass is to be formed includes a bottom, side members and end members and is in the form of an open-top box. A top portion of a typical forming chamber includes a top, sides and an end which are sealed to the bottom portion in order to provide an enclosed forming chamber. Because the canal and lip through which and over which molten glass flows prior to being deposited on the molten metal extends above the surface of the molten metal and inwardly from the inlet end of a forming chamber over the molten metal, it is quite easy, in a mechanical sense, to provide a casing for the bottom portion of a forming chamber such as described by Pilkington, Hainsfurther or Galey and Sensi. Such a casing extends above the intended level for the molten metal pool within such a forming chamber.

According to the teachings of Hitchcock, molten glass is delivered directly through a front wall of a furnace and onto molten metal in an enclosed forming chamber. The front wall of the furnace is a common wall to the enclosed forming chamber, constituting an inlet end wall thereof. Because of the necessarily high temperature of molten glass in the furnace as it is delivered to the enclosed forming chamber, this common wall is necessarily a refractory wall. Such a wall is subject to deterioration during use and it may be readily observed that any leak developing in such a common wall beneath the level of the surface of the molten metal pool within the enclosed forming chamber will result in the loss of molten metal into the bottom of the adjacent glassmaking furnace. This is so since the molten metal is fluid and is more dense than molten glass. In the apparatus of Heal, molten glass is delivered over a refractory bridge. Failure of the downstream wall of the bridge would result in a massive loss of molten metal.

The apparatus disclosed in Heal and that disclosed in Hitchcock are not provided with means for supporting a stream of molten glass for delivery onto molten tin which can be maintained or replaced when worn without requiring a tear-down and replacement of the entire front wall of a glassmaking furnace. As disclosed in U.S. Pat. No. 3,884,665 to Charles K. Edge and Gerald E. Kunkle, entitled "Flat Glass Manufacturing Apparatus and Method," it is desirable to provide a means for delivering molten glass from a glassmaking furnace to a glass forming chamber that is sufficiently independent of either the glassmaking furnace or the glass forming chamber so that it may be individually maintained. Thus, it is desirable to provide a molten glass delivery means that includes a bottom portion that effectively extends the bottom casing of the glass-making furnace and is connected to the bottom casing of the glass forming chamber. Such a delivery means also includes side members and a roof which is connected to both the glassmaking furnace and the glass forming chamber. The delivery means further includes means for metering the flow of molten glass through it in order to control the rate of glass production.

In U.S. Pat. No. 3,884,665 and U.S. Pat. No. 3,854,922 which are incorporated by reference herein, there are descriptions of a suitable apparatus for delivering molten glass from a glassmaking furnace to a glass forming chamber. Such an apparatus comprises a bottom threshold member, side members or jambs extending upwardly from the threshold member and a metering member extending downwardly toward the threshold member. These elements, in combination, define an opening through which molten glass may flow. The threshold member preferably rests on an extended section of the front wall of a glassmaking furnace and against the inlet end of a glass forming chamber.

The mounting device for the threshold comprises tension members for drawing the threshold against the forming chamber and outboard compression members for urging side members or jambs inwardly against the ends of the threshold. The tension members act upon coolers which are holddown devices for the threshold and extend transversely through it. As will be seen from the description which follows, the present invention provides an end seal for a threshold member having particularly desirable characteristics.

SUMMARY OF THE INVENTION

A glass forming chamber is provided with an impervious support structure extending from its inlet beneath its bottom portion; a threshold member rests on this support structure and extends transversely across the inlet end of the glass forming chamber at a suitable elevation for supporting molten glass during delivery onto molten metal in the forming chamber; means are provided for urging this threshold down against the support member and also against the inlet end of the forming chamber in order to provide a sealed vessel for containing the molten metal within the forming chamber in intimate relation with the threshold member.

The threshold is provided with one or more transverse holes extending through it for receiving either a holddown member to which the described downward urging means is connected or a cooler or heater. In a preferred embodiment cooling pipes are extended through such holes and act not only as coolers, but also as holddown members.

Compression seals are positioned at the ends of the threshold or outside outwardly disposed jambs, if provided. These seals serve to completely close any space in the holes about the outside walls of the pipes or members extending through them. The preferred compression seals comprise "O" ring seals in plates gasketed against the outer ends of the threshold or jambs as the case may be. The "O" ring plate and the accompanying flat gaskets are compressed against the threshold assembly by a nut or like element connected to the pipe or member extending through the threshold. Thus, ingress of air into the space between the pipe or holddown member and the walls of the transverse hole is prevented. This is quite beneficial, for it precludes the transpiration of air from the holes through the threshold refractory into the forming chamber which is desirably sealed from the outside environment in order to prevent the oxidation of molten metal contained in it. Even slight oxidation in the region of molten glass delivery is undesirable and the elimination of all air ingress results in a glass product of improved surface quality.

It may be noted that the proposed compression seal assembly can serve as means for urging jambs against the threshold since the cooler can act as a transverse tension member with the seal assembly serving as a compression member against the outside faces of the jambs.

The invention may be further appreciated from the drawings accompanying this description.

DESCRIPTION OF THE PREFERRED EMBODIMENTS

Figure 1:
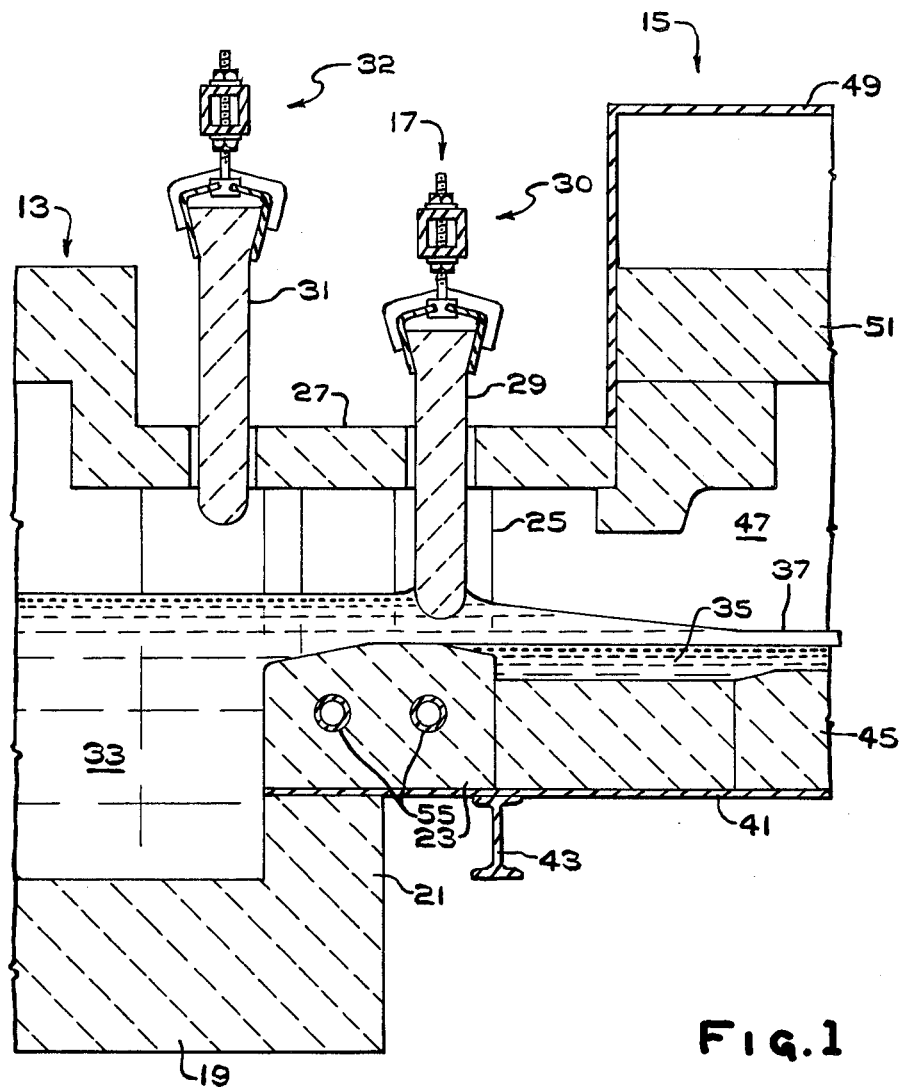
FIG. 1 is a partial sectional view of a longitudinal elevation of a delivery means, furnace and forming chamber according to this invention.

Referring now to FIG. 1, there is shown the refiner of a glass-making furnace 13 which is connected to a forming chamber 15 through a glass delivery facility 17 for delivering molten glass from the refiner 11 to the forming chamber 15.

The refiner includes side walls, a roof or crown, a bottom 19 and a front basin wall 21. The furnace, including the refiner, acts as a container for molten glass. The refiner bottom, walls and roof are generally constructed of refractory materials in a conventional manner.

Figure 2:
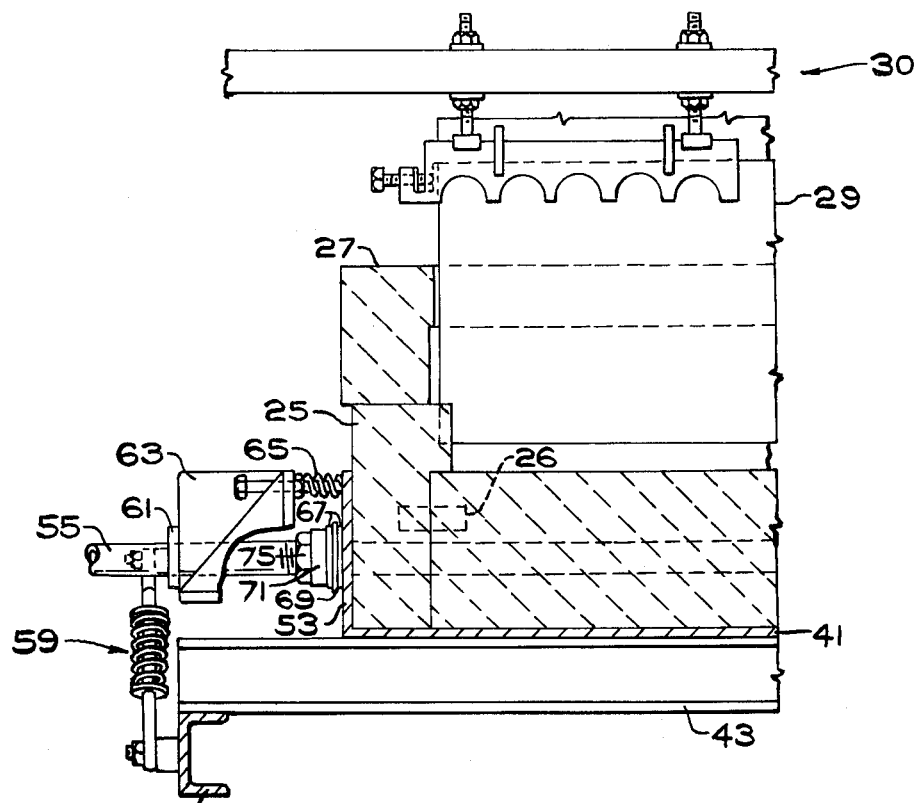
FIG. 2 is a partial sectional view of a transverse elevation of a delivery means threshold region according to this invention showing a preferred embodiment in which the compression seals serve as means for urging jamns against a threshold.
Figure 3:
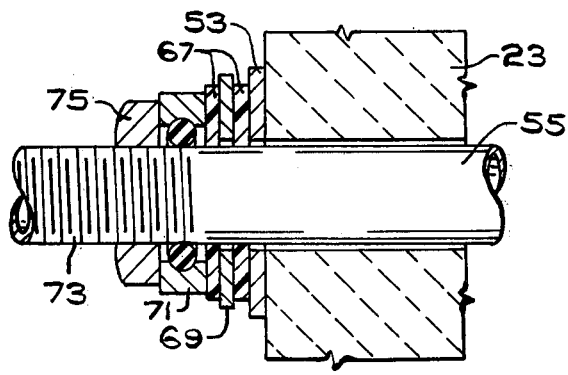
FIG. 3 is a detailed view of the seal assembly fitted against a jamb or threshold end.

The delivery facility 17 includes a threshold 23, supported in part by the extended basin wall 21. The delivery facility also includes side members or jambs 25 extending upwardly from the ends of the threshold 23. These may be joined or connected to the threshold 23 by pins 26 as seen in FIG. 2. The delivery means further includes a roof 27, preferably a flat arch, extending from the furnace front wall to the forming chamber 15 and across from one side member 25 to the other. The delivery facility also includes a metering member or control tweel 29 for engaging molten glass and controlling the size of the opeing through which molten glass may flow. This control tweel 29 is supported by an apparatus 30 for raising and lowering it which can include means for manually or automatically controlling its elevation (not fully shown, but may be that shown in U.S. Pat. No. 3,764,285 to Matesa and Farabaugh). A backup metering member or tweel 31 is also provided. It is mounted on means 32 for raising or lowering it.

During operation a pool of molten glass 33 is maintained in the glassmaking furnace 13 and a stream of molten glass is discharged from the pool 33 over the threshold 23 substantially horizontally (perfectly horizontally or downwardly along a slope but supported) onto a pool of molten metal, preferably tin, 35 contained in the forming chamber. Once on the molten metal, the glass is advanced as a stream or body of glass 37 and cooled to form a dimensionally stable, continuous ribbon or sheet of glass.

The forming chamber 15 includes a bottom casing 41 resting on a supporting structure 43. Inside the casing 41 is a refractory bottom liner 45, side wall liners 47 and end dam or lip (not shown) at the downstream or outlet end of the chamber. These, along with the threshold 23, form a container for holding the pool of molten metal 35 upon which the body of glass 37 may be supported for forming into a continuous sheet of flat glass.

The forming chamber also includes an upper casing 49 having a roof 51 mounted inside it and spaced above the pool of molten metal 35. The roof 51, along with the upper part of sides 47, forms a headspace over the pool of molten metal 35. This headspace is provided with a protective atmosphere, usually an inert or reducing atmosphere, during use.

The forming chamber casing 41 is generally an impervious shell made of metal, preferably steel. The casing may comprise a top portion and a bottom portion that are separated by a space above the elevation of the molten metal with the space sealed by easily removable elements to provide easy access to the inside of the forming chamber. The bottom portion of the casing is essentially an open-top metal box resting on supports and containing a refractory lining comprising the bottom 45 and a portion of the walls 47. The casing is provided with a transverse opening for receiving the threshold 23.

Extending from the upstream or inlet end of the forming chamber and connected to the casing 41 are side casing plates 53. The threshold 23 and jamb 25 assembly is positioned between these plates 53. A pipe 55 (or pipes) extends transversely through the threshold 23 and is connected at its end portions to a mounting member 57. The mounting member 57 is suitably positioned beneath the elevation of the forming chamber 15 to act as a restraint or dead man for a tension arm 59 to be described below which connects the pipe 55 to the mounting member 57. The mounting member 57 may simply be a channel connected to a support 43 for the forming chamber or may be any conveniently located fixed element. The side casing plates 53 act as bearing plates for engaging the threshold 23. The pipes 55 (or other transverse members such as rods or the like) extend through the side plates 53 and are used to apply a downward force to the threshold 23. One or more transverse member may be used to apply an inwardly directed force to the jambs 25, FIG. 2.

The support structure 43 and the pipes 55 act also as transverse tension members in this embodiment of the invention. Connected to each end of the support 43 is a backup plate 61 and a brace plate 63 which act as a bucking assembly. Compression members 65 extend between the brace plate 63 and the jamb 25 in order to urge it against the threshold 23. In the embodiment shown, each compression member is a bolt extending through a hole in the plate 63 and resting against a separate bearing relief plate or against the side causing plate 53 to distribute its force against the outer face of the jamb. A backup nut may be threaded on the bolt to drive it against the plate 53, or a compression spring may be located between the plates 63 and 53 with the bolt merely serving as a guide for the spring.

The assembly is provided with gaskets 67 about pipes 55 at the sides of the delivery facility against the side casing plates 53. These gaskets surround respective pipes 55 and seal against the outside surface of the casing plates 53 over the annular openings through the plates surrounding the pipes. A plate washer 69 is disposed around each pipe 55 between its gaskets 67. An "O" ring seal assembly 71 is disposed over the gasket and washer and tightened against the "O" ring assembly 71 on threads 73 on the pipe 55 is a compression fitting or nut 75. Thus, the assembly threshold 23 and jambs 25 are compressed together and all external access to the annular space about the pipe 55 is closed by the "O" ring seal assembly 71.

The gasket is preferably made of a high-temperature resistant silicone rubber, polyimide composition or the like. The pipe or other transverse member extending through the threshold to which the assembly is sealed is preferably made of a corrosion and heat-resistant material such as stainless steel as are the washer, compression nut and "O" ring seal assembly, except for the ring itself which is preferably a high-temperature resistant rubber material. An "O" ring seal is preferred over other packing or sealing assemblies as it can readily withstand slight working or movement between the pipe and the jambs and casing plates while maintaining a tight seal.

In general, this invention contemplates the use of any compression seal about the transverse openings through a threshold to prevent the ingress of gases of the external atmosphere into the space which remains when a cooler, heater or force-applying member is extended through a threshold. Those skilled in the art will, with the aid of this disclosure, recognize other specific assemblies which incorporate the essential features of this invention as claimed here.

I claim:

1. In an apparatus for making flat glass comprising a glassmaking furnace connected to a glass forming chamber through a molten glass delivery facility wherein the forming chamber includes an impervious metal casing having an inner refractory liner containing a pool of molten metal for supporting glass during forming and the delivery facility includes a refractory threshold for supporting molten glass during its delivery to the forming chamber with the threshold being at least partially disposed inside the casing between side casing plates and having at least one thermal control member extending completely through a transverse opening in the threshold and through openings in the side casing plates of the casing the improvement which comprises a compression fitted seal disposed around each end portion of the thermal control member and the seals held against outer exposed faces of the side casing plates on both sides of the delivery facility with sufficient force to compress against the refractory threshold for completely sealing the transverse opening through the threshold from communication with gases surrounding the delivery facility.

2. The apparatus according to claim 1 wherein each compression fitted seal comprises an "O" ring seal assembly and a washer and gasket held against the outer face of a side casing plate by a compression fitting connected to the thermal control member about which the seal is disposed.

3. The apparatus according to claim 2 wherein the gasket is a compressible, flat gasket and the compression fitting is connected to the thermal control member to provide sufficient force against the gasket to at least partially compress it.

4. The apparatus according to claim 3 wherein the flat gasket is a silicone rubber gasket.

* * * * *